(12) United States Patent
Birdsall et al.

(10) Patent No.: US 9,116,805 B2
(45) Date of Patent: Aug. 25, 2015

(54) METHOD AND SYSTEM FOR PROCESSING EVENTS

(75) Inventors: David W Birdsall, Palo Alto, CA (US); Gunnar D Tapper, Colorado Springs, CO (US); Azim Fatehi, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 251 days.

(21) Appl. No.: 13/814,700

(22) PCT Filed: Oct. 6, 2010

(86) PCT No.: PCT/US2010/051634
§ 371 (c)(1),
(2), (4) Date: Feb. 6, 2013

(87) PCT Pub. No.: WO2012/047215
PCT Pub. Date: Apr. 12, 2012

(65) Prior Publication Data
US 2013/0145222 A1 Jun. 6, 2013

(51) Int. Cl.
*G06F 11/00* (2006.01)
*G06F 11/07* (2006.01)

(52) U.S. Cl.
CPC ........ *G06F 11/0766* (2013.01); *G06F 11/0775* (2013.01); *G06F 11/0784* (2013.01); *G06F 11/0787* (2013.01)

(58) Field of Classification Search
CPC ............ G06F 11/0766; G06F 11/0784; G06F 11/0787
USPC .................................................. 714/48, 57
See application file for complete search history.

(56) References Cited

U.S. PATENT DOCUMENTS

| | | | |
|---|---|---|---|
| 5,809,238 A * | 9/1998 | Greenblatt et al. | 709/202 |
| 6,263,455 B1 * | 7/2001 | Bannister | 714/25 |
| 6,314,533 B1 * | 11/2001 | Novik et al. | 714/39 |
| 7,072,800 B1 * | 7/2006 | Fernandez et al. | 702/186 |
| 2003/0158841 A1 * | 8/2003 | Britton et al. | 707/3 |
| 2003/0200486 A1 * | 10/2003 | Marwaha | 714/39 |
| 2004/0120250 A1 | 6/2004 | Langevin et al. | |
| 2005/0050040 A1 | 3/2005 | Theobald et al. | |

FOREIGN PATENT DOCUMENTS

| | | | |
|---|---|---|---|
| KR | 20010047567 A1 | 6/2001 | |
| KR | 20030080566 A | 10/2003 | |

OTHER PUBLICATIONS

Korean Intellectual Property Office, International Search Report, Jun. 29, 2011, 3 pages, Daejeon, Republic of Korea.

* cited by examiner

*Primary Examiner* — Philip Guyton
(74) *Attorney, Agent, or Firm* — Hewlett-Packard Patent Department (57) ABSTRACT

The present disclosure provides a computer system with an event handling architecture. The computer system includes a processing node (104) comprising an event generator (200) configured to detect a system error corresponding to the processing node (104) and generate a tokenized event message. The tokenized event message is structured according to conformance rules. The system also includes a data broker (202) configured to receive the tokenized event message and send the tokenized event message to a structured query language (SQL) event consumer (204). The SQL event consumer (204) is configured to generate a database record based on the tokenized event message and the conformance rules. The system also includes an event repository (106) with a relational database configured to receive the database record from the SQL event consumer (204).

12 Claims, 6 Drawing Sheets

METHOD AND SYSTEM FOR PROCESSING EVENTS

BACKGROUND

As servers become cheaper, more numerous, and more complex, managing them becomes a greater proportion of data-center cost. To monitor the health of a data center, system software is generally configured to generate events when significant state changes or errors occur. These events are written to an event log, where they can be analyzed by humans or manageability software to diagnose problems, determine appropriate repair actions, and the like. With increasing complexity, logs grow in size, and with data center scale-out they grow in number. Thus, human analysis of event logs to accurately diagnose system problems becomes more difficult and time consuming. Additionally, such event logs are generally not well suited for large-scale automated analysis.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Embodiments of the present invention provide a method of processing system events generated by components of a computer system. In accordance with embodiments, a system is provided for storing event data generated by various nodes of a computer system to a central event log, or repository, which includes a relational database. The event messages and the relational database may be defined according to specified conformance rules and structured such that the data included in the event message may be readily stored to the relational database. Additionally, the repository may also include a textual representation of each event message, enabling the use of both SQL searches and natural language searches of the repository. Embodiments of the present techniques thus enable Business Intelligence techniques such as data warehousing, data mining, and analytics to be applied to the event data stored in the repository.

Figure 1:
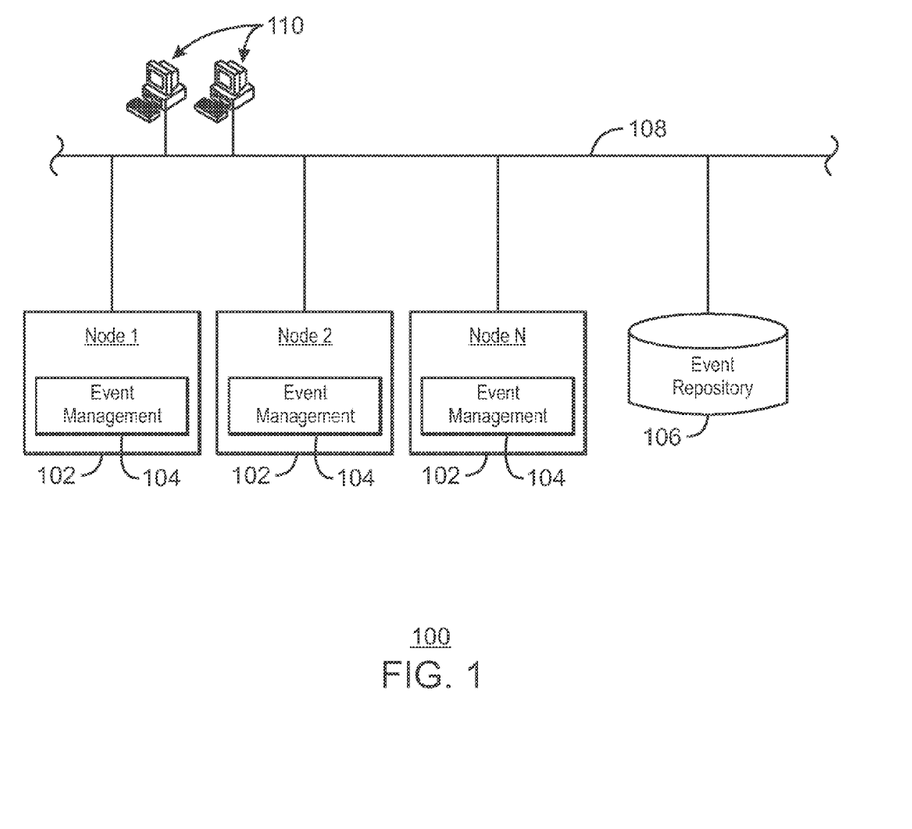
FIG. 1 is a block diagram of a computer system configured to store event messages to a structured error event repository, in accordance with embodiments of the invention.

FIG. 1 is a block diagram of a computer system configured to store event messages to a structured error event repository, in accordance with embodiments of the invention. The computer system is generally referred to by the reference number 100. As shown in FIG. 1, the computer system 100 may include a plurality of nodes 102, which may be various types of network devices such as servers, storage systems, processors, and the like. In embodiments, the computer system 100 may be a clustered computing system and each node 102 may be a server in the cluster. In embodiments, the computer system may include a parallel database, and the nodes 102 may be individual processors, symmetric multiprocessing (SMP) nodes, and the like. Generally, the nodes 102 may be any type of computing device that can be configured to generate a system event. Each node 102 can include an event management module 104 configured to generate system event messages and publish the event messages to one or more event consumers. The event messages generated by the nodes 102 may be stored to an event repository 106.

The nodes 102 may be operatively coupled by a communications network 108, for example, a wide area network (WAN), local area network (LAN), virtual private network (VPN), the Internet, and the like. The communications network 108 may be a TCP/IP protocol network or any other appropriate protocol. Any number of clients 110 may access the nodes 102 through the communications network 108. Those of ordinary skill in the art will appreciate that the configuration of the computer system 100 is but one example of a computer system may be implemented in an exemplary embodiment of the present invention.

Figure 2:
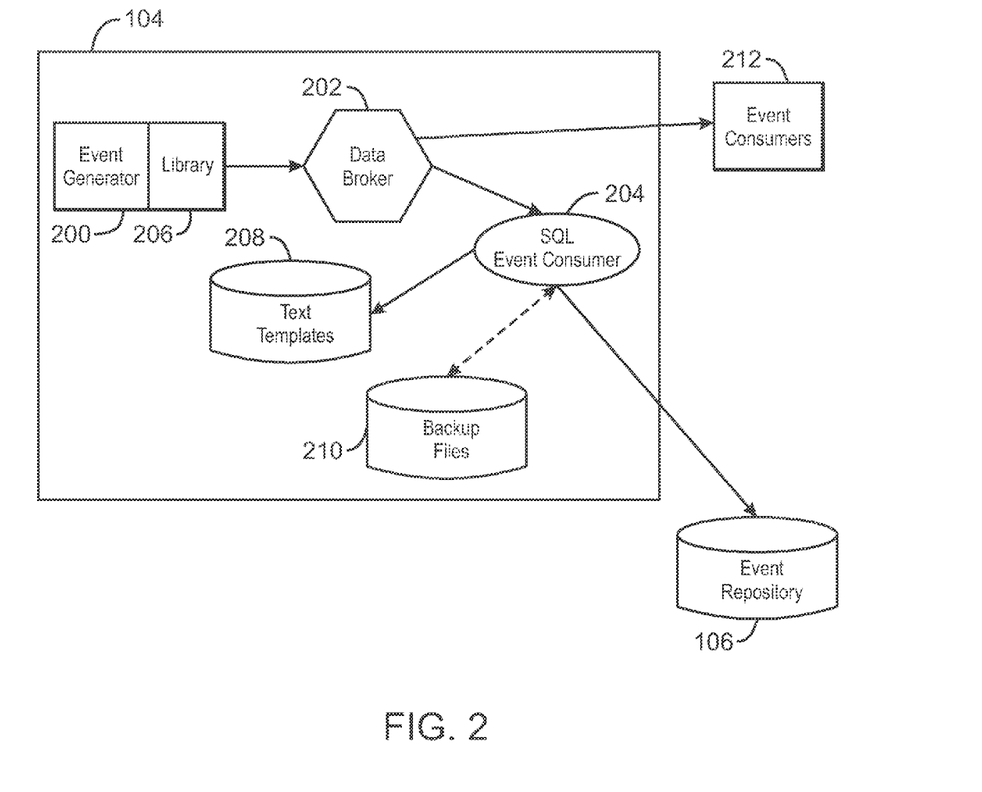
FIG. 2 is a block diagram of an event management module, in accordance with embodiments of the invention.

FIG. 2 is a block diagram of an event management module, in accordance with embodiments of the invention. Components of the event management module 104 may be implemented in hardware, software, or some combination thereof. For example, the event management module 104 may include a non-transitory, computer-readable medium that stores code configured to direct a processor to perform the event processing tasks described herein. The non-transitory, computer-readable medium can comprise a random access memory (RAM), a read only memory (ROM), a hard disk drive, an array of hard disk drives, an optical drive, an array of optical drives, a universal serial bus (USB) drive, a digital versatile disk (DVD), a compact disk (CD), a flash drive, a RAM drive, and the like. In embodiments, components of the event management module 104 may be implemented in a single node 102 as shown in FIG. 2, or distributed across two or more nodes 102.

The event management module 104 can include an event generator 200, a data broker 202, and SQL event consumer 204. The event generator 200 reports system events, including state changes, errors, warnings, and other conditions that may be of interest to humans or other subsystems within the computer system 100. The event generator 200 may be configured to generate an event message in response to any system event occurring in the computer system 100 or individual components thereof. For example, an event message may be generated in response to various software or hardware failures occurring in the computer system 100 such as a server becoming unavailable, a failure of a storage disk or other storage media, router or switch failure, and the like.

In embodiments, an event message may be generated in response to table storage engine (TSE) migration event. For example, migration of a data table storage engine may occur if a node 102 in a parallel database engine fails, in which case the processing load of the failed node 102 can be migrated to another node 102. The migration of the data table storage can affect performance of the parallel database by doubling the workload on a single node 102. In embodiments, an event message may be generated in response to database locks that persist for a specified time period, for example, approximately one minute or more. Database locks promote consistency of data in a database by locking data while generating a response to a database query. Database locks that persist for long periods of time can cause performance issues because other queries or processes trying to access the locked data will be blocked until the lock is released. The system events described herein are only a limited number of the types of system events that may be reported by the event generator 200, as a person of ordinary skill in the art will recognize many additional types of reportable system events in accordance with embodiments.

Event messages may be encoded as a collection of tokenized data fields, which may be organized as value/attribute pairs. The event generator 200 may include an event library 206 for encoding the tokenized event messages. For example, a tokenized event message may include attributes such as a time stamp, error code, identifiers indicating the subsystem, node 102 or component that generated the error, identifiers indicating a transaction that generated the error, an underlying operating system of the node 102 that generated the error, and the like. In embodiments, each attribute and corresponding value may be represented in a canonical form that provides a consistent vocabulary for the various data fields that may be represented in the error events. In this way, token consistency may be achieved for individual nodes 102, groups of nodes 102, types of nodes 102, or even across the entire computer system 100. In embodiments, the error events may be encoded using the serialization protocol such as the Google® Protocol Buffers format. In embodiments, the tokenized error events are encoded as a flat representation, which can be more readily stored to a relational database as described below.

The data broker 202 sends event messages to the applicable event consumers. In embodiments, the data broker 202 includes a message-oriented middleware (MOM) that uses the Advanced Message Queuing Protocol (AMQP), for example, Apache Qpid. The event messages reported by the event generator 200 may be sent to a data broker 202, which publishes the event message to one or more event consumers in the computer system 100 that are subscribed to the event message, such as the SQL event consumer 204 and other types of event consumers, some of which are described in relation to FIG. 3. Different event consumers may be subscribed to different types of event messages.

The SQL event consumer 204 may be configured to receive all of the tokenized event messages generated by the various event generators 200 existing in the computer system 100. The SQL event consumer 204 receives the tokenized event messages and generates database records for storage to the event repository 106. The event repository 106 serves as a central, consolidated database for storage of the event messages originating in different nodes 102 or subsystems of the computer system 100. Different nodes 102 or subsystems within the computer system 100 may emit event messages that have different structures containing different types of information suitable to each particular node 102 or subsystem. In embodiments, the event messages pertaining to a particular node 102 or subsystem may be stored to the same table within the event repository.

The design of the tokenized event messages for each node 102 or subsystem takes into account the eventual repository representations, thus promoting the suitability of the event message content for relational database storage and query. The tokenized event message may be structured according to conformance rules that enable multiple tokenized event messages from one or more nodes 102 or subsystems to be mapped to a single table within the relational database. Each such table is referred to herein as an events table. The conformance rules dictate consistent data field names for the various types of information that may be included in the tokenized event messages, such as process names, process identifiers, and the like. The same conformance rules are used by the event generator 200 in generating the event messages and the SQL event consumer 204 in interpreting event messages and generating corresponding database records for storage to the event repository 106. The event repository 106 may also adhere to known considerations for design of a data warehouse, such as those taught by Kimball, et al. in "The Data Warehouse Toolkit." For example, the various event tables may be fact tables, and certain types of event message information, such as system ID, may become dimensions. For example, events generated by a disk storage subsystem may have a common set of tokens and be stored in a disk storage events table. Events generated by a transaction subsystem may have a different set of common tokens and be stored in a transaction events table.

Each event message can be written to a particular row of the database table and each token of event message can be mapped to a particular column. An example of a database may have separate columns for timestamps, error codes, and any other identifiers corresponding to tokenized data fields of the event message. For example, a database table configured to store event messages corresponding to a system event caused by a database engine may include separate columns for the SQL error code, the query ID identifying the query that caused the system event, table identifiers such as the catalog, schema, and table name of the corresponding table, among others. A database table configured to store event messages corresponding to system events generated by storage system may include separate columns for a disk identifier, disk state, and error code, among others.

In embodiments, the SQL event consumer 204 also generates a textual representation for each of the event messages using a template facility 208 that includes a mapping from tokens to English language text messages or other natural language representations. In this way, the SQL event consumer 204 can substitute each token of the event message into a textual representation. The textual representation of the event message may be stored to the event repository 106 along with the tokenized event messages. In this way, the textual representations of the event messages stored to the event repository 106 may be searched using a natural language keyword search. In embodiments, the SQL event consumer 204 publishes the textual representations of the event messages to other event consumers in the computer system 100.

In embodiments, the event management system can be configured to capture event messages even if the event repository 106 is malfunctioning or is otherwise unavailable. For example, the event management module can include a backup file 210 for storing event messages if the event repository 106 is unavailable. The backup file can be a flat file for temporarily storing event messages. If the SQL event consumer determines that the event repository 106 is unavailable, the SQL event consumer stores event messages to the backup file. When the event repository 106 becomes available, the SQL event consumer can automatically retrieve any event messages stored to the backup file, generate a corresponding database record, and store the database record to the event repository 106. In embodiments, one or more additional event consumers 212 may subscribe to event message published by the data broker 202, bypassing the event repository 106. In this way, a system administrator or administrative software may be able to view a live stream of event messages as they occur.

Figure 3:
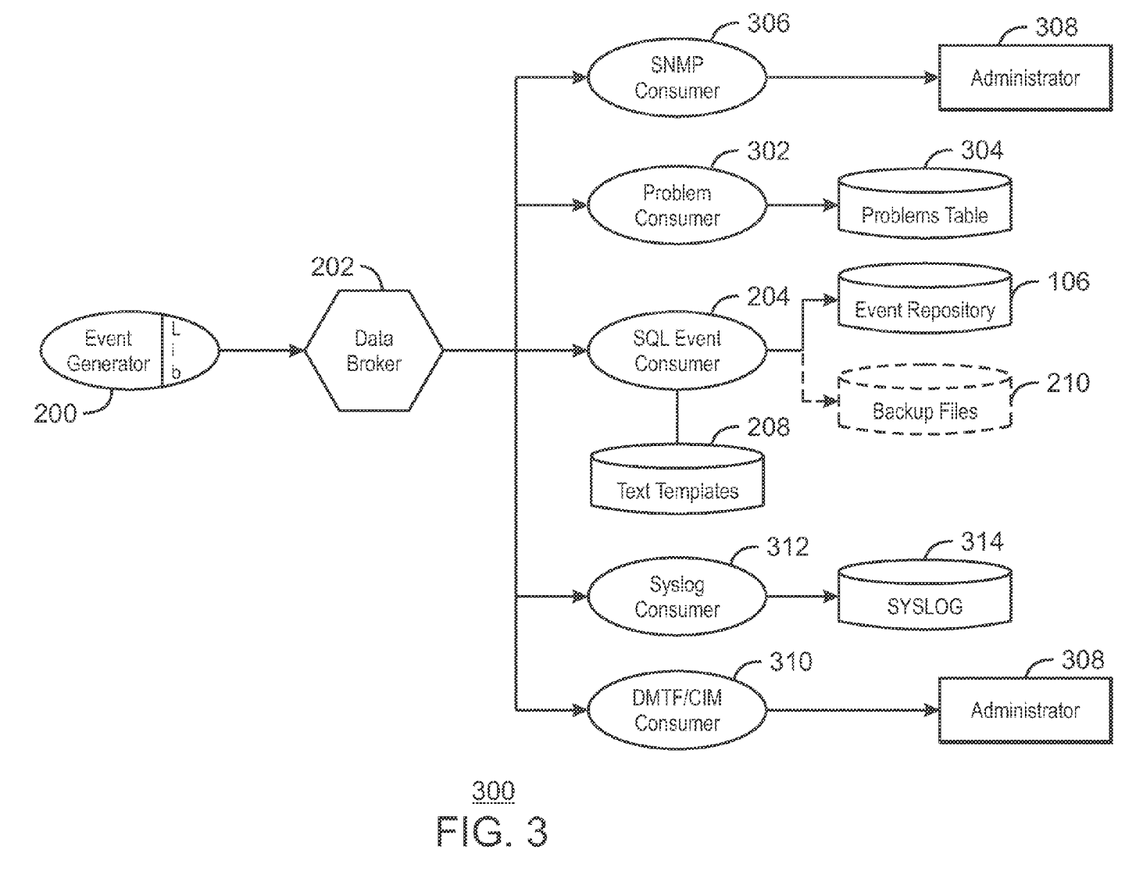
FIG. 3 is a block diagram of an event system architecture for processing system events, in accordance with embodiments of the invention.

FIG. 3 is a block diagram of an event system architecture for processing system events, in accordance with embodiments of the invention. The event architecture is referred to by the reference number 300, and can include a number of processing modules, such as event consumers and the like, which may be implemented in hardware or software. The processing modules may be distributed throughout the computer system 100 in accordance with the design attributes of a particular implementation. An example of an event system architecture can include the event generator 200, data broker 202, SQL event consumer 204, event repository 106, text templates 208, and backup file 210, as discussed with respect to FIG. 2.

Also shown in FIG. 3, are some examples of additional event consumers 212 that may be included in the event architecture. For example, the event architecture 300 may include a problem consumer 302 configured to generate a problem representation of system events. The problem representation is an automatically generated interpretation of one or more event messages that can identify the cause of the system events and determine whether the cause of the system event has been resolved. For example, a number of event messages corresponding to a disk error may be interpreted by the problem consumer 302 to determine that a particular disk in the computer system 100 is offline or otherwise not operational. A subsequent event message indicating that the same disk is now available may be used by the problem consumer 302 to generate an indication that he problem has been resolved. In this way, the problem consumer 302 can combine related event messages to provide a more coherent representation of the state of the computer system 100. The problem consumer 302 can receive event messages directly from the data broker 202 and/or as republished event messages from the SQL event consumer 204. Problem representations may be stored to a problems table 304, which may be viewed, for example, by a network administrator.

The event architecture 300 may also include a system network management protocol (SNMP) consumer 306. The system network management protocol is a component of the Internet Protocol Suite as defined by the Internet Engineering Task Force (IETF) and includes a set of standards for network management. The SNMP consumer 306 can receive event messages from the data broker 202 directly or as republished by the SQL event consumer 204. The SNMP consumer 306 can covert some or all of the received event messages into system notifications commonly referred to as "traps." The SNMP traps may be sent to a network manager such as an administrator 308 or administrative software to alert the manager regarding significant system events that warrant administrative attention, such as state and error information of hardware devices, software subsystems and the like.

The event architecture may also include a Common Information Model (CIM) consumer 310. The Common Information Model is an open standard defined and published by the Distributed Management Task Force (DMTF) that defines how managed elements in a network are represented. This is intended to allow consistent management of these managed elements, independent of their manufacturer or provider. The Common Information Model enables multiple subsystems in the network to exchange management information about these managed elements and enables active control and management of components of the computer system 100 (FIG. 1). The CIM consumer 310 can receive event messages from the data broker 202 directly or as republished by the SQL event consumer 204. The CIM consumer 310 can covert some, or all, of the received event messages into CIM system notifications. The CIM system notifications may be sent to a network manager such as an administrator 308 or administrative software to alert the manager regarding significant system events that warrant administrative attention, such as state and error information of hardware devices, software subsystems and the like.

The event architecture may also include a Syslog consumer 312. Syslog is a standard defined by the Syslog working group of the Internet Engineering Task Force (IETF) for logging program messages, and can be used to notify network administrators of problems or performance issues related to the network 100. The Syslog consumer can receive textual representations of event messages generated and republished by the SQL event consumer 204. The Syslog consumer can covert the received event messages to a Syslog repository 314 which may be viewed or searched by a network administrator. In embodiments, the Syslog repository 314 can serve as a backup resource if the event repository 106 is unavailable.

Figure 4:
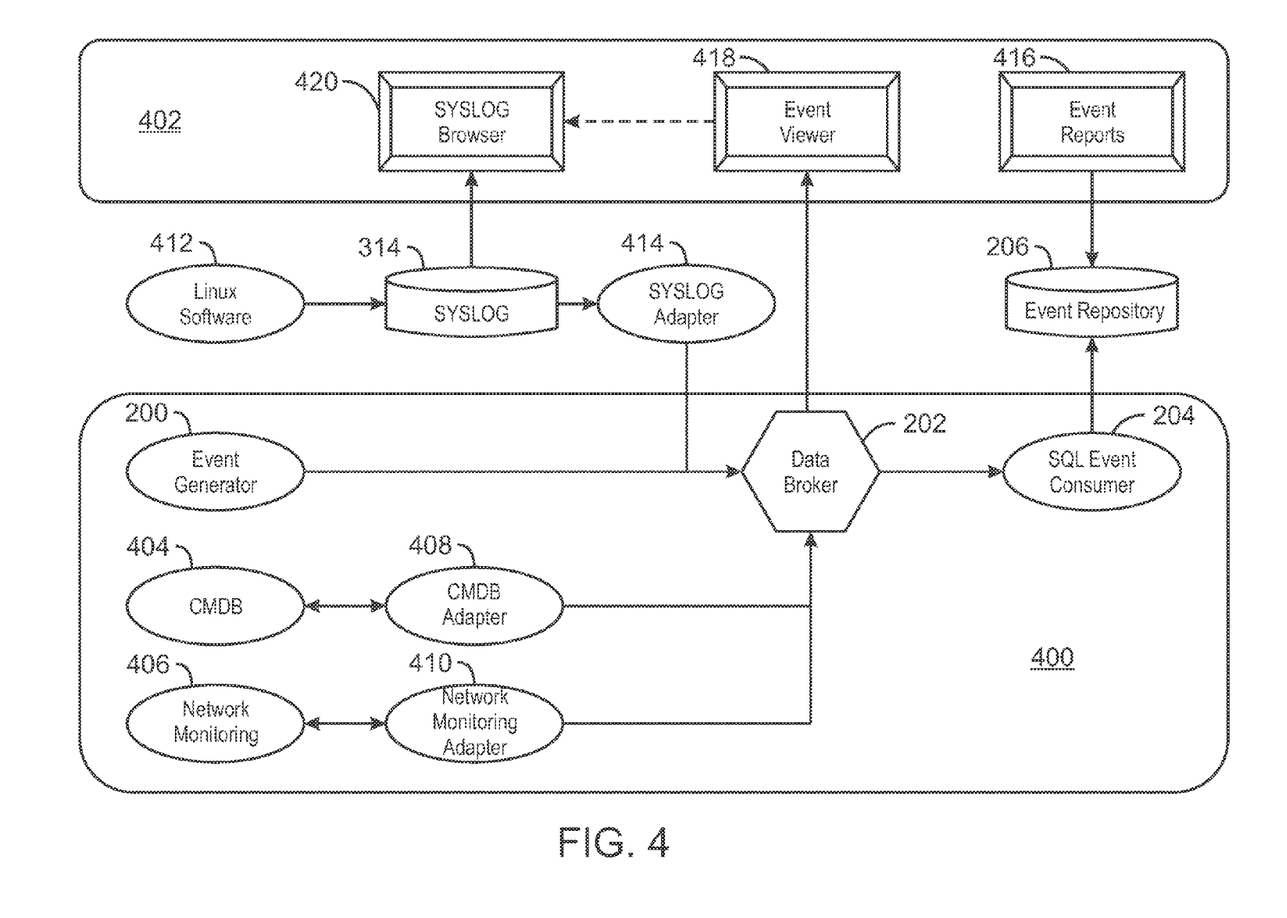
FIG. 4 is a block diagram of another event management module, in accordance with embodiments of the invention.

FIG. 4 is a block diagram of another event management module 104, in accordance with embodiments of the invention. The event management module 104 can include a platform layer 400 and a presentation layer 402. The platform layer of the event management module 104 can include an event generator 200, data broker 202, and SQL event consumer 204, as described n relation to FIG. 2. Additionally, the platform layer can also include additional event providers, for example, a configuration management database (CMDB) 404 and a network monitoring application 406 such as the HP Operations Center, the HP Universal CMDB software, Nagios®, and the like. The configuration management database 404 can include a repository of information representing an authorized configuration of the significant components of the computer system 100. The configuration management database 404 can be used to store the relationships between network components and track their configuration. A CMDB adapter 408 may be used to query the configuration management database 404 regarding an infrastructure state of the computer system 100. Information received from the configuration management database 404 may be converted by the configuration management database adapter 408 into an event message, which may be sent to the data broker 202. The data broker 202 publishes the event message to the SQL event consumer 204, which stores the event message to the event repository 106 as discussed with respect to FIG. 2.

The network monitoring application 406 monitors components of the computer system 100, alerting users when problems or performance issues arise or are resolved. A network monitoring adapter 410 may be used to query the network monitoring application 406 regarding service states of the computer system 100. Information received from the network monitoring application 406 may be converted by the network monitoring adapter 410 into a tokenized event message, which may be sent to the data broker 202. The data broker 202 publishes the event message to the SQL event consumer 204, which stores the event message to the event repository 106 as discussed with respect to FIG. 2

In an embodiment, components of the computer system 100 may operate using Linux software 412. The Linux software 412 may generate Syslog events that are sent to a Syslog repository 314 as described with respect to FIG. 3. As shown in FIG. 4, a Syslog adapter 414 may be operatively coupled to the Syslog repository 314. The Syslog adapter 414 can read Syslog messages from the repository and convert the Syslog messages into tokenized event messages and send the tokenized event messages to the data broker 202. The Syslog adapter 414 may be configured to publish only those messages not written to Syslog by the Syslog consumer 312, or some subset thereof, avoiding repeated republishing of the same event. The data broker 202 publishes the event message to the SQL event consumer 204, which stores the event message to the event repository 106 as discussed with respect to FIG. 2.

The presentation layer of the event management module 104 can include one or more user interfaces that enable users such as system administrators to view the event messages and other system messages. For example, the presentation layer may include an event reports interface 416 that enables the user to perform database queries on data stored to the event repository 106 and generate reports. The presentation layer can also include an event viewer 418 that enables a user to obtain a live view of event messages as they are published by the data broker 202. The presentation layer can also include a Syslog browser 420, which may be launched by the user from the event viewer 418. The Syslog browser 420 enables the user to view Syslog messages stored to the Syslog repository 314.

Figure 5:
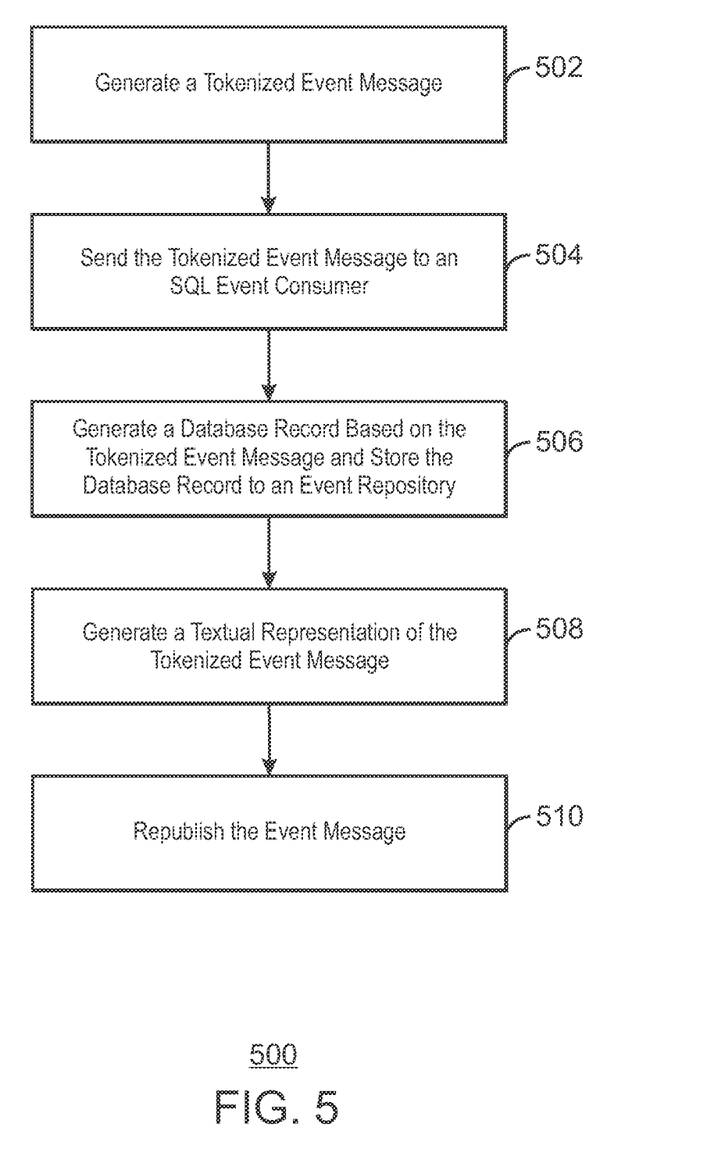
FIG. 5 is a process flow diagram of a method of handling system events, in accordance with embodiments of the invention.

FIG. 5 is a process flow diagram of a method of processing system events, in accordance with embodiments of the inventions. The method is referred to by the reference number 500 and begins at block 502. At block 502, a system event is detected at one of the nodes 102 (FIG. 1) of the computer system 100, and an event message is generated, for example, by the event management module 104. The event message is a tokenized event message that is structured according to conformance rules that enable the tokenized event message to be mapped to a relational database, as described in relation to FIG. 2.

At block 504, the tokenized event message is sent to an SQL event consumer 204 (FIG. 2). For example, the event message may be sent to the data broker 202, which publishes the event message to any event consumers that are subscribed to the event message, including the SQL event consumer 204.

At block 506, a database record may be generated based on the tokenized event message and the conformance rules. The conformance rules used in designing the structure of the tokenized event message are the same conformance rules used to generate the database record. The database record can be stored to an event repository 106 comprising a relational database. In embodiments, the tokenized event message may be stored to a backup file if the event repository 106 is unavailable. When the event repository 106 becomes available, the tokenized event message may be retrieved from the backup file, converted to a database record, and stored to the event repository 106.

At block 508, a textual representation of the tokenized event message can be generated and added to the event repository 106. At block 510, the tokenized event message and/or the textual representation of the tokenized event message can republished to one or more additional event consumers, such as a Syslog event consumer, CIM event consumer, problem consumer, and SNMP consumer, among others.

Figure 6:
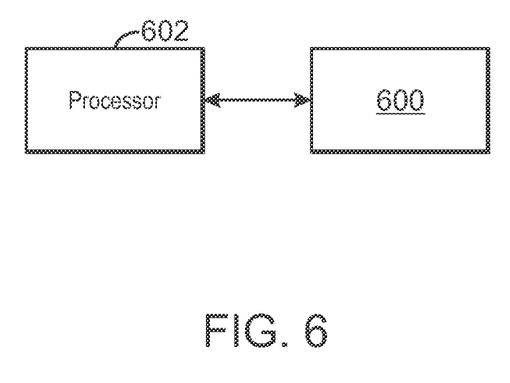
FIG. 6 is a block diagram of a non-transitory, machine-readable medium that stores code for processing system events, in accordance with embodiments of the invention.

FIG. 6 is a block diagram of a non-transitory, machine-readable medium that stores code for processing system events, in accordance with embodiments of the invention. The non-transitory, machine-readable medium is generally referred to by the reference number 600. The non-transitory, machine-readable medium 600 may correspond to any typical storage device that stores computer-implemented instructions, such as programming code or the like. For example, the non-transitory, machine-readable medium 600 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices.

A processor 602 generally retrieves and executes the instructions stored in the non-transitory, machine-readable medium 600 to process system events. The non-transitory, machine-readable medium 600 can include instructions configured to direct the processor to receive a tokenized event message correlated with a processing node 106 of a computer network 100, wherein the tokenized event message is structured according to conformance rules. A database record can be generated based on the tokenized event message and the conformance rules and stored to an event repository 106 comprising a relational database. In embodiments, a textual representation of the tokenized event message is generated and added to the event repository 106. In embodiments, the tokenized event message is sent to a backup file 210 if the event repository 106 is unavailable. The tokenized event message can be written from the backup file 210 to the event repository 10 when the event repository 106 becomes available.

What is claimed is:

1. A computer system, comprising:
 a processing node comprising an event generator configured to detect a system error correlated with the processing node and generate a tokenized event message, wherein the tokenized event message is structured according to conformance rules;
 a data broker configured to receive the tokenized event message and send the tokenized event message to a structured query language (SQL) event consumer, the SQL event consumer configured to generate a database record based on the tokenized event message and the conformance rules;
 an event repository comprising a relational database configured to receive the database record from the SQL event consumer; and
 a backup file configured to receive the tokenized event message from the SQL event consumer if the event repository is unavailable, wherein the SQL event consumer writes the tokenized event message from the backup file to the event repository when the event repository becomes available.

2. The computer system of claim 1, wherein the SQL event consumer is configured to generate a textual representation of the tokenized event message and add the textual representation to the event repository.

3. The computer system of claim 2, wherein the SQL event consumer is configured to republish the textual representation of the tokenized event message In another event consumer.

4. The computer system of claim 3, comprising a Syslog event consumer configured to receive the textual representation of the tokenized event message republished by the SQL event consumer.

5. The computer system of claim 1, comprising a plurality of additional processing nodes configured to generate additional tokenized event messages structured according to the conformance rules, wherein additional database records based on the additional tokenized event messages are stored to a same table of the relational database.

6. The computer system of claim 1, comprising additional event consumers configured to receive the tokenized event message or a textual version of the tokenized event message, wherein the additional consumers comprise a Common Information Model (CIM) consumer, a system network management protocol (SNMP) consumer, a problem consumer, or combinations thereof.

7. A method, comprising:
- detecting a system event correlated with a processing node of a computer network and generating a tokenized event message corresponding to the system event, wherein the tokenized event message is structured according to conformance rules;
- sending the tokenized event message to an SQL event consumer;
- generating a database record based on the tokenized event message and the conformance rules;
- storing the database record to an event repository comprising a relational database; and
- sending the event message to a backup file if the event repository is unavailable, and writing the tokenized event message from the backup file to the event repository when the event repository becomes available.

8. The method of claim 7, comprising generating a textual representation of the tokenized event message and adding the textual representation to the event repository.

9. The method of claim 8, comprising republishing the textual representation of the tokenized event message to another event consumer.

10. The method of claim 7, comprising publishing the tokenized event message or a textual version of the tokenized event message to additional consumers comprising a Common Information Model (CIM) consumer, a system network management protocol (SNMP) consumer, a problem consumer, or combinations thereof.

11. A non-transitory, computer readable medium, comprising instructions configured to direct a processor to:
- receive a tokenized event message correlated with a processing node of a computer network, wherein the tokenized event message is structured according to conformance rules;
- generate a database record based on the tokenized event message and the conformance rules and store the database record to an event repository comprising a relational database; and
- send the tokenized event message to a backup file if the event repository is unavailable, and write the tokenized event message from the backup file to the event repository when the event repository becomes available.

12. The non-transitory, computer readable medium of claim 11, comprising instructions configured to direct the processor to generate a textual representation of the tokenized event message and add the textual representation to the event repository.

* * * * *